US011888225B2

(12) United States Patent
Kim et al.

(10) Patent No.: US 11,888,225 B2
(45) Date of Patent: Jan. 30, 2024

(54) # METAMATERIAL STRUCTURE, METAMATERIAL-TYPE TRANSPARENT HEATER, AND RADAR APPARATUS USING METAMATERIAL-TYPE TRANSPARENT HEATER

(71) Applicant: UNIVERSITY-INDUSTRY COOPERATION GROUP OF KYUNG HEE UNIVERSITY, Yongin-si (KR)

(72) Inventors: Sun Kyung Kim, Suwon-si (KR); Young Bin Kim, Yongin-si (KR); Eun Joo Lee, Goyang-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 17/825,335

(22) Filed: May 26, 2022

(65) Prior Publication Data

US 2023/0282985 A1 Sep. 7, 2023

(30) Foreign Application Priority Data

Mar. 2, 2022 (KR) ........................ 10-2022-0026681

(51) Int. Cl.
*H01Q 15/00* (2006.01)
*H01Q 1/02* (2006.01)

(52) U.S. Cl.
CPC ........... *H01Q 15/0086* (2013.01); *H01Q 1/02* (2013.01)

(58) Field of Classification Search
CPC ...... H01Q 1/02; H01Q 1/1271; H01Q 1/1278; H01Q 1/1285; H01Q 1/3233; H01Q 15/0086
See application file for complete search history.

(56) References Cited

U.S. PATENT DOCUMENTS

2018/0269559 A1* 9/2018 Celle ........................ H05B 3/12

FOREIGN PATENT DOCUMENTS

KR 10-2146381 B1 8/2020
WO WO2021/022883 A1 * 2/2021

* cited by examiner

*Primary Examiner* — Robert Karacsony
(74) *Attorney, Agent, or Firm* — Sughrue Mion, PLLC

(57) ABSTRACT

A metamaterial structure according to one embodiment of the present disclosure is formed in a metal pattern that allows microwave transmittance to approach the transmittance of air in a specific frequency band of microwaves. In this case, the metal pattern is provided in an electrically interconnected form to perform a heating function.

15 Claims, 17 Drawing Sheets

| Parameters | #1 (um) | #2 (um) | #3 (um) |
|---|---|---|---|
| a | 1500 | 1250 | 100 |
| D | 1400 | 1500 | 1200 |
| w0 | 150 | 100 | 75 |
| w1 | 400 | 500 | 350 |
| g | 150 | 100 | 75 |
| metal% | 51.31 | 74.82 | 71.15 |

METAMATERIAL STRUCTURE, METAMATERIAL-TYPE TRANSPARENT HEATER, AND RADAR APPARATUS USING METAMATERIAL-TYPE TRANSPARENT HEATER

CROSS-REFERENCE TO RELATED APPLICATION

This application claims priority to Korean Patent Application No. 10-2022-0026681, filed on Mar. 2, 2022, in the Korean Intellectual Property Office, the disclosure of which is incorporated herein by reference.

BACKGROUND OF THE DISCLOSURE

Field of the Disclosure

The present disclosure relates to a metamaterial structure, a metamaterial-type transparent heater, and a radar apparatus using the metamaterial-type transparent heater. More particularly, the present disclosure relates to a metamaterial structure for manufacturing a transparent heater having a high microwave transmittance and being capable of functioning as a heater, wherein the metamaterial structure has a high microwave transmittance in a specific frequency band of microwaves and is formed in the form of metal patterns connected to each other, and the performance of a radar apparatus may be reliably secured by using the transparent heater; a metamaterial-type transparent heater; and a radar apparatus using the metamaterial-type transparent heater.

Description of the Related Art

In general, in smart mobility such as an autonomous vehicle or a drone, a microwave-band radar apparatus is used to accurately calculate location information of a visual obstacle (e.g., a person or a structure) or other mobility.

Microwaves refer to electromagnetic waves having a frequency of about 0.1 to 100 GHz (or a wavelength of 3 mm to 30 cm). Microwaves are used in various fields such as aviation radio, mobile communication, military communication, satellite TV broadcasting, and radar communication according to frequency bands. In particular, microwaves having a frequency band of 76 to 81 GHz are used in a radar sensor module of a vehicle radar apparatus. That is, since a radar sensor module can precisely measure the relative distance and speed between a vehicle on which the radar sensor module is mounted and an object, the radar sensor module is recognized as a key component of smart mobility.

In addition, to stably maintain the original performance of smart mobility by a radar sensor module under a harsh driving environment, a transparent heater for performing a constant temperature maintenance function is essential.

A typical radar sensor module is covered with a protective cover that cushions external shocks. However, when smart mobility is operated under a harsh driving environment, mist may be generated in a protective cover due to icing or frost, which may result in deterioration of the performance of a radar sensor module. To prevent this, a transparent heater is preferably installed between a protective cover and a radar sensor module.

Since the above-described transparent heater is formed in the form of a heating film and disposed in front of a radar sensor module, the transparent heater must have a very low microwave attenuation rate and high conductivity to improve heating temperature and temperature uniformity. In addition, to secure reliability and adhesion to curved surfaces under harsh driving conditions, a transparent heater having high durability and high elasticity is required.

However, in the case of conventional transparent heaters, there is usually a trade-off relationship between microwave transmittance and electrical conductivity, which are main performance indicators. For example, in the case of a general lattice-type metal transparent electrode, when the filling fraction of a metal arranged in a lattice form is increased, electrical conductivity and heat generation performance are improved, but microwave transmittance is reduced, which deteriorates communication signal quality.

As described above, increasing both transmittance and conductivity, which are the performance indicators of a transparent electrode, is very essential for securing the performance of a radar apparatus. However, it is very difficult to design and manufacture to satisfy the above conditions, so technology development is very urgent.

Accordingly, the present disclosure intends to dramatically improve the transmittance and conductivity of a transparent electrode by applying the technical idea of a metamaterial structure to the transparent electrode. As a related art document, there is Korean Patent No. 10-2146381 (Invention Title: TEMPERATURE-SENSITIVE SENSOR USING META-STRUCTURE FOR ADSORBING ELECTROMAGNETIC WAVES, registration date: Aug. 13, 2020).

SUMMARY OF THE DISCLOSURE

Therefore, the present disclosure has been made in view of the above problems, and it is an object of the present disclosure to provide a metamaterial structure, wherein, when the metamaterial structure is applied to a transparent heater, the microwave transmittance and electrical conductivity of the transparent heater may be significantly improved, and the performance of a radar apparatus may be reliably secured even in a harsh environment by using the transparent heater; a metamaterial-type transparent heater; and a radar apparatus using the metamaterial-type transparent heater.

It is another object of the present disclosure to provide a metamaterial structure having a microwave transmittance similar to that of air in a specific frequency band of microwaves and being formed in the form of metal patterns electrically connected to each other, wherein a transparent heater having a high microwave transmittance and excellent heating function may be easily manufactured by using the metamaterial structure; a metamaterial-type transparent heater; and a radar apparatus using the metamaterial-type transparent heater.

In accordance with one aspect of the present disclosure, provided is a metamaterial structure formed in a metal pattern that allows microwave transmittance to approach transmittance of air in a specific frequency band of microwaves, wherein the metal pattern is provided in an electrically interconnected form to perform a heating function.

Preferably, the metal pattern may be formed so that, for both polarizations orthogonal to each other in the specific frequency band of microwaves, a relationship between metal filling fraction (E) at which a metal is filled per unit are of the metal pattern and the microwave transmittance (T) satisfies an equation of $T>(1-E)$.

Here, the specific frequency band of microwaves may be set to 70 to 110 GHz including a W band, and the microwave transmittance may satisfy an equation of T>(1-E) regardless of a size of the metal filling fraction in the specific frequency band of microwaves.

In addition, the metal pattern may be formed of at least one metallic material of copper, silver, gold, aluminum, a liquid metal, and an alloy containing any one of copper, silver, gold, and aluminum. At this time, patterning of the metal pattern may be performed by any one process of a semiconductor lithography process or a printing process.

Preferably, the metal pattern may be provided in a structure in which a plurality of unit structures is continuously connected. In this case, one unit structure may be disposed per unit area of the metal pattern and may be electrically interconnected with other adjacent unit structures.

Preferably, the unit structure may have structural symmetry with respect to two directions orthogonal to each other with respect to a center point of a unit area of the metal pattern to prevent the occurrence of polarization dependent microwave transmittance.

Preferably, at least one electric dipole induced by a partial gap of the metal pattern may be provided in the unit structure. At this time, the specific frequency band of microwaves may be changed by selectively changing structural variables of the unit structure. For example, the structural variables may include at least one of a size of the unit structure, a metal thickness of the unit structure, a metal width of the unit structure, a separation distance of the electric dipoles, and a size of the electric dipoles.

Preferably, the unit structure may include a first linear pattern formed to extend in a first direction on a unit area of the metal pattern; a second linear pattern formed to extend in a second direction on a unit area of the metal pattern so as to intersect the first linear pattern; and a circular pattern provided in a circular shape around an intersection point of the first and second linear patterns and electrically interconnected with the first and second linear patterns.

Here, pattern gaps for performing an electric dipole function of the unit structure may be provided in the circular pattern. In this case, the pattern gaps may be formed in a structure in which a predetermined portion of the circular pattern is short-circuited.

When the unit area of the metal pattern is divided into four quadrant regions, the at least one pattern gap may be respectively disposed in the four quadrant areas.

In addition, the first and second linear patterns and the circular pattern may each be formed to be symmetrical with respect to a center point of the unit area of the metal pattern to prevent occurrence of polarization dependence on microwaves.

In addition, the specific frequency band of microwaves may be changed by selectively changing structural variables of the first and second linear patterns and the circular pattern. For example, the structural variables may include at least one of a length of the first linear pattern, a thickness of the first linear pattern, a width of the first linear pattern, a length of the second linear pattern, a thickness of the second linear pattern, a width of the second linear pattern, a diameter of the circular pattern, a thickness of the circular pattern, a width of the circular pattern, a separation distance of the pattern gaps, and the number of the pattern gaps.

In accordance with another aspect of the present disclosure, provided is a metamaterial-type transparent heater including the above-described metamaterial structure; and an electrical terminal having one end connected to one side of the metamaterial structure and the other side to which external electricity for heating the metamaterial structure is applied.

Here, the metamaterial-type transparent heater according to another aspect of the present disclosure may further include a transparent film for stably supporting the metamaterial structure and the electrical terminal, wherein one end of the metamaterial structure and the electrical terminal is coated with the transparent film.

In addition, the metamaterial-type transparent heater according to another aspect of the present disclosure may further include a plurality of nano-conductors disposed to be in electrical contact with any one surface of upper and lower surfaces of the metamaterial structure and configured to improve temperature uniformity of the metamaterial structure by improving interconnectivity of a metal pattern of the metamaterial structure, In this case, the nano-conductors may include at least one of metal nanowires, metal fibers, and carbon nanotubes.

In accordance with yet another aspect of the present disclosure, provided is a radar apparatus including the above-described metamaterial-type transparent heater; a transparent protective cover disposed on a front surface of the metamaterial-type transparent heater to protect the metamaterial-type transparent heater; and a radar sensor module disposed on a rear surface of the metamaterial-type transparent heater to detect an obstacle in front of the protective cover through microwaves passing through the protective cover and the metamaterial-type transparent heater.

Here, the radar apparatus according to yet another aspect of the present disclosure may further include a transparent insulation packaging member disposed between the metamaterial-type transparent heater and the protective cover; and a transparent substrate member disposed between the metamaterial-type transparent heater and the radar sensor module.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1:
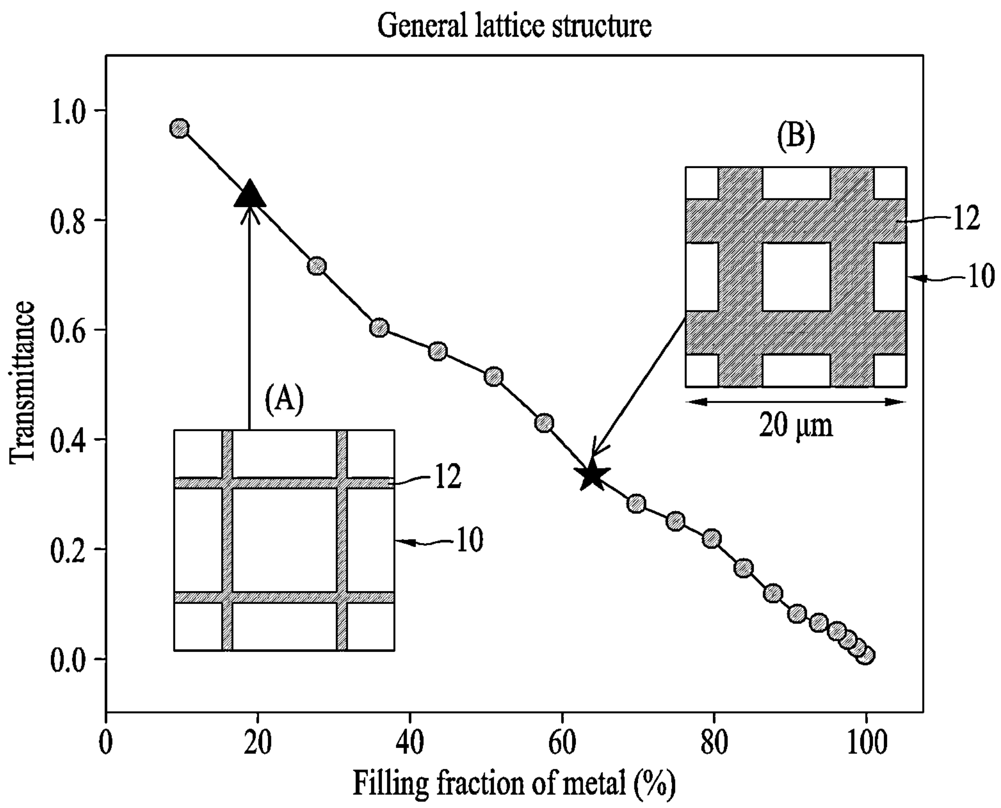
FIG. 1 illustrates the relationship between transmittance and metal filling fraction in a conventional general lattice structure.

Hereinafter, preferred embodiments of the present disclosure will be described in detail with reference to the accompanying drawings. However, the scope of the present disclosure is not limited by these embodiments. Like reference numerals in the drawings denote like elements.

Figure 2:
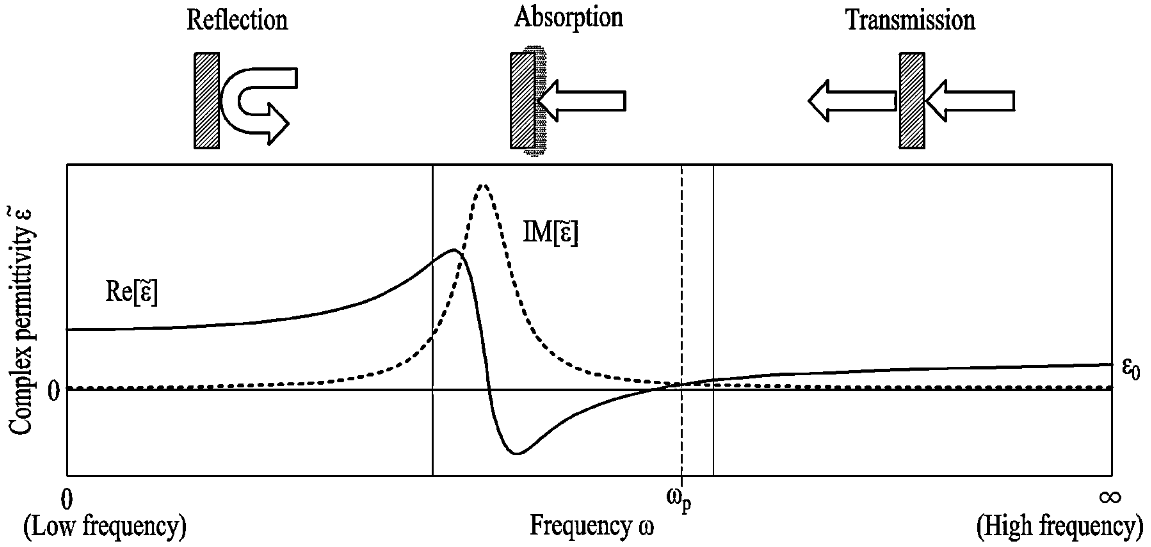
FIG. 2 is a reference diagram for explaining the characteristics of a metal for microwaves with respect to plasma frequencies.
Figure 3:
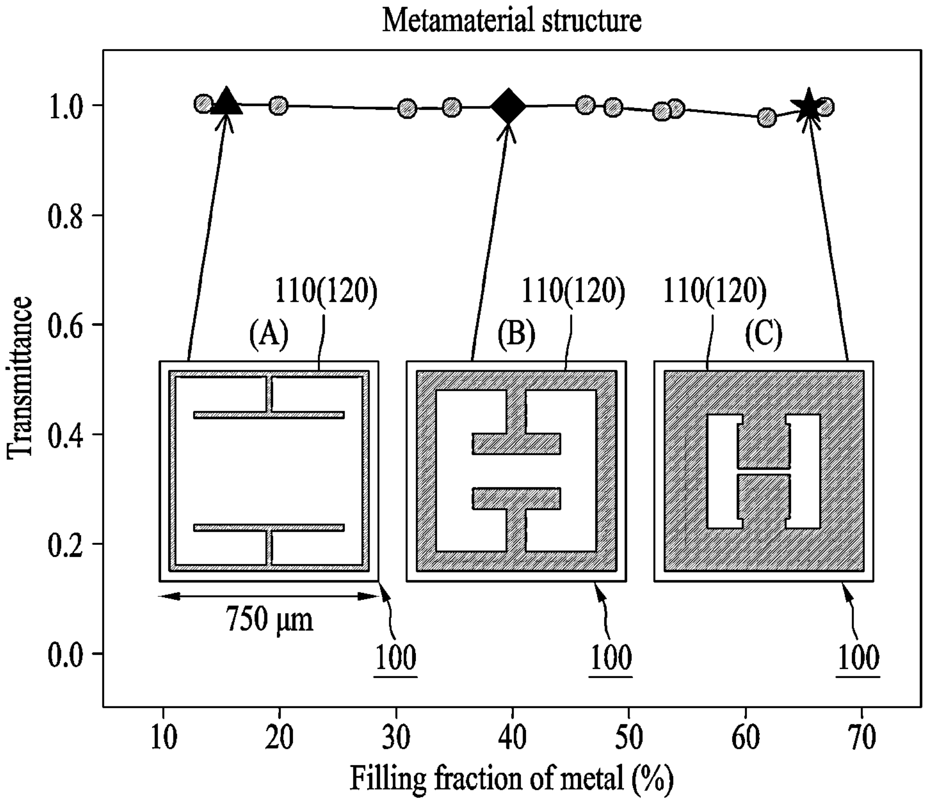
FIG. 3 illustrates the relationship between transmittance and metal filling fraction in a metamaterial structure according to one embodiment of the present disclosure.
Figure 4:
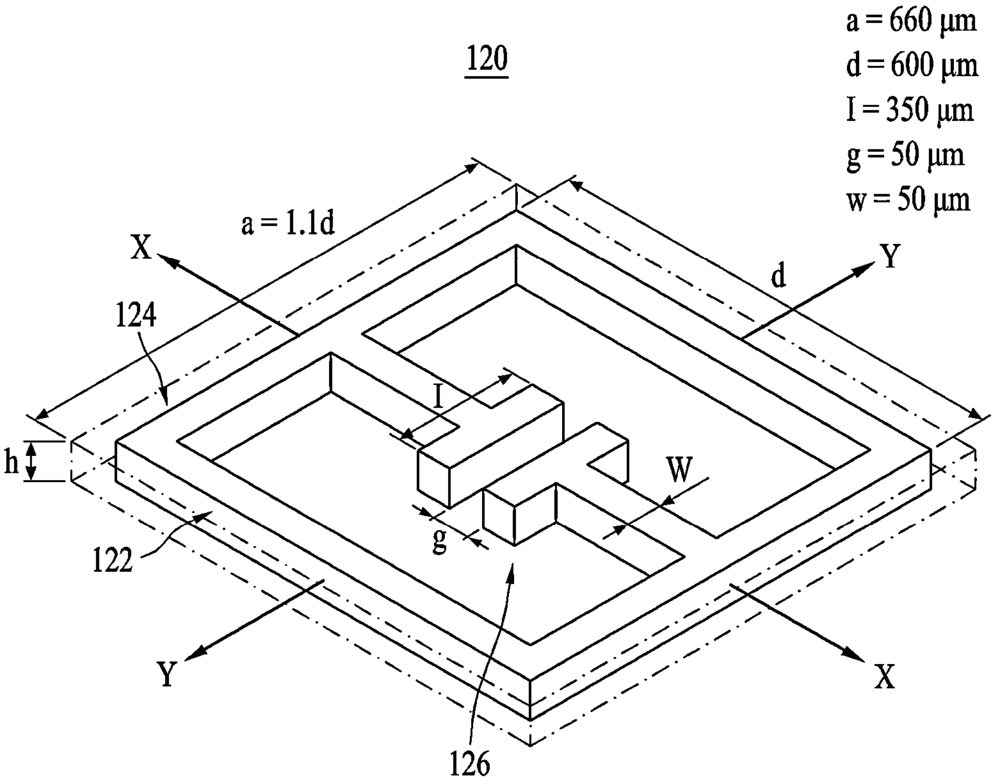
FIG. 4 schematically illustrates a unit structure of the metamaterial structure shown in FIG. 3.

FIG. 1 shows the relationship between transmittance (T) and metal filling fraction (E) in a conventional general lattice structure 10, FIG. 2 is a reference diagram for explaining the characteristics of a metal for microwaves with respect to plasma frequencies, FIG. 3 shows the relationship between transmittance (T) and metal filling fraction (E) in a metamaterial structure 100 according to one embodiment of the present disclosure, FIG. 4 schematically illustrates a unit structure 120 of the metamaterial structure 100 shown in FIG. 3, and FIGS. 5*a*, 5*b*, 6*a*, 6*b* and 6*c* are graphs showing the results according to change of structural variables for the unit structure 120 of the metamaterial structure 100 shown in FIG. 4.

FIG. 1 is a graph showing the relationship between transmittance (T) and metal filling fraction (E) in the general lattice structure 10.

As shown in FIG. 1, the general lattice structure 10 has been used in a conventional electric heater and may be formed of a metal lattice pattern 12 in which a metal is disposed in a lattice shape. In the general lattice structure 10, microwave transmittance (T) linearly decreases as metal filling fraction (E) increases, whereas microwave transmittance (T) linearly increases as metal filling fraction (E) decreases.

Here, the metal filling fraction (E) is a fraction of the space filled by metal per unit area of the general lattice structure 10. Accordingly, when the width of the metal lattice pattern 12 is increased, the metal filling fraction (E) is increased, and when the length of the metal lattice pattern 12 is increased, the unit area of the general lattice structure 10 is increased, so that the metal filling fraction (E) is reduced.

That is, the general lattice structure 10 satisfies the relationship between metal filling fraction (E) and microwave transmittance (T) shown in Equation 1 below.

$$T=(1-E) \quad \text{[Equation 1]}$$

For example, in the general lattice structure 10 shown in FIG. 1A, metal filling fraction (E) is 30%, and microwave transmittance (T) is 70%. In the general lattice structure 10 shown in FIG. 1B, metal filling fraction (E) is 70%, and microwave transmittance (T) is 30%.

As shown in Equation 1 and FIG. 1, the linear relationship between the metal filling fraction (E) and the transmittance (T) in the general lattice structure 10 may be described as the relationship between a metal and plasma frequency shown in FIG. 2.

FIG. 2 shows a permittivity of metal near a plasma frequency and characteristic changes with respect to transmission, absorption, and reflection of electromagnetic waves.

As shown in FIG. 2, metals behave like "metal mirrors" with high reflectivity for electromagnetic waves of frequencies lower than the plasma frequency. Conversely, metals behave like "transparent dielectrics" with high transmittance for electromagnetic waves of frequencies lower than the plasma frequency.

However, since plasma frequencies of conventional metals are in the ultraviolet region, these metals exhibit reflective properties in the visible, infrared, and microwave regions. Accordingly, when the metal lattice pattern 12 of the general lattice structure 10 is formed of a metallic material, the metal lattice pattern 12 impedes the propagation of microwaves, which increases metal filling fraction (E), and consequently reduces microwave transmittance (T).

FIG. 3 shows the metamaterial structure 100 according to one embodiment of the present disclosure and a graph showing the relationship between transmittance (T) and metal filling fraction (E) in the metamaterial structure 100 of the present embodiment.

As shown in FIG. 3, the metamaterial structure 100 according to one embodiment of the present disclosure is formed of a metal pattern 110 that allows a microwave transmittance (T) to approach the transmittance of air in a specific frequency band of microwaves, and the metal pattern 110 may be provided in an electrically interconnected form to perform a heating function.

The metal pattern 110 may be formed of at least one metallic material of copper (Cu), silver (Ag), gold (Au), aluminum (Al), a liquid metal (for example, eutectic GaIN), and an alloy containing any one of copper (Cu), silver (Ag), gold (Au), and aluminum (Al). In this case, the metal pattern 110 may be patterned in a pre-designed pattern through any one of a semiconductor lithography process and a printing process.

For example, the metal pattern 110 may be formed of any one metallic material of copper (Cu), silver (Ag), gold (Au), aluminum (Al), and a liquid metal (for example, eutectic GaIN), may be formed of an alloy containing any one of copper (Cu), silver (Ag), gold (Au), and aluminum (Al), or may be formed of two or more metallic materials selected from the alloy, copper (Cu), silver (Ag), gold (Au), aluminum (Al), and a liquid metal (for example, eutectic GaIN).

As described above, since the metal pattern 110 is formed of a metallic material having excellent electrical conductivity, the metal pattern 110 may have conductive properties. Accordingly, since the metal pattern 110 is electrically interconnected, the metal pattern 110 may perform a heating function as a heating wire when electricity is applied. For reference, when the metal pattern 110 is formed using a liquid metal, even when a part of the metal pattern 110 is damaged or short-circuited, the separated portions are reconnected to each other after a certain period of time due to the characteristics of the liquid metal, and the metal pattern 110 is restored to the original state thereof.

In addition, the metal pattern 110 of the present embodiment may satisfy the relationship between metal filling fraction (E) and microwave transmittance (T) in a specific frequency band of microwaves shown in Equation 2 below. Here, the metal filling fraction (E) is a metal filling fraction per unit area of the metal pattern 110.

$$T>(1-E) \quad \text{[Equation 2]}$$

For example, in the metamaterial structure 100 shown in FIG. 3A, the metal filling fraction (E) of the metal pattern 110 is 15%, and the microwave transmittance (T) thereof is almost 100%. In the metamaterial structure 100 shown in FIG. 3B, the metal filling fraction (E) of the metal pattern 110 is 40%, and the microwave transmittance (T) thereof is almost 100%. In the metamaterial structure 100 shown in FIG. 3C, the metal filling fraction (E) of the metal pattern 110 is 65%, and the microwave transmittance (T) thereof is almost 100%. Accordingly, in the case of the metamaterial structure 100 shown in FIG. 3, even when the metal filling fraction (E) increases or decreases in a specific frequency band of microwaves, the microwave transmittance (T) is maintained close to 100%, which means that microwaves are almost completely transmitted.

Hereinafter, in the present embodiment, a specific frequency band of microwaves in which microwave transmittance (T) appears close to 100% may be set to 70 to 110 GHz including a W band, and this is defined as a "resonant frequency band". In the resonant frequency band, microwave transmittance (T) may satisfy an equation of T>(1-E) regardless of the magnitude of metal filling fraction (E). However, the specific frequency band of microwaves is preferably set appropriately in consideration of the microwave frequency band of a radar device 300 to be described later, and microwave transmittance (T) is preferably set as close to 100% as possible.

As described above, microwaves in the resonant frequency band recognize the metal pattern 110 of the metamaterial structure 100 as a metamaterial having a microwave transmittance (T) of close to 100%. Thus, during the propagation of microwaves, there is little loss due to reflection and absorption.

In general, a metamaterial implements a desired permittivity in a specific frequency region, for example, a permittivity that does not exist in nature, through structurization or mixed arrangement of a material with a well-known permittivity. Methods of designing a metamaterial are divided into "resonant metamaterial" of artificially exciting electric dipoles or magnetic dipoles using metal and "nonresonant metamaterial" of mixing and arranging two or more types of materials with different permittivities at a subwavelength scale.

Here, in the case of resonant metamaterial (also referred to as meta-atom), when optical loss of a metal due to free electrons is negligible, design of artificial material dispersion is possible. Accordingly, a resonant metamaterial may operate effectively in a microwave frequency band where a metal is considered a perfect conductor.

That is, the metamaterial structure 100 according to the present embodiment may have microwave transmission characteristics completely different from the metal lattice pattern 12 of the general lattice structure 10 described above by providing the metal pattern 110 as a metamaterial-formed pattern. However, the microwave transmission characteristics of the metamaterial structure 100 of the present embodiment may be implemented only in a resonant frequency band.

FIGS. 4 to 6*c* show the first unit structure 120 of the metamaterial structure 100 according to one embodiment of the present disclosure and transmittance change according to structural change of the first unit structure 120.

Referring to FIGS. 4 to 6*c*, the metal pattern 110 formed on the metamaterial structure 100 according to the present embodiment may be provided in a structure in which a plurality of first unit structures 120 are continuously connected. One of the first unit structures 120 as described above may be disposed per unit area of the preset metal pattern 110. The metal pattern 110 of the metamaterial structure 100 may be provided in a form in which the first unit structures 120 are continuously connected to other first unit structures 120 disposed adjacent to each other. In this case, a unit metal pattern may be formed on each of the first unit structures 120. The unit metal patterns of the first unit structures 120 may be gathered to form the metal pattern 110 of the metamaterial structure 100.

The pattern of the first unit structure 120 is preferably designed so that microwave transmittance (T) is close to 100% according to metal filling fraction (E) in the resonance frequency band of microwaves. In addition, in the present embodiment, even when the metal filling fraction (E) of the first unit structure 120 changes from 10% to 70%, microwave complete transmission characteristics may be secured through optimization of the pattern of the first unit structure 120.

For example, the unit metal pattern of the first unit structure 120 according to the present embodiment may include first linear patterns 122, second linear patterns 124, and electric dipoles 126.

The first linear patterns 122 may be respectively formed on the horizontal sides of the first unit structure 120 to be parallel to a first direction (X-X), which is the horizontal direction of the first unit structure 120.

The second linear patterns 124 may be respectively formed on the vertical sides of the first unit structure 120 to be parallel to a second direction (Y-Y), which is the vertical direction of the first unit structure 120. Hereinafter, in the present embodiment, the first unit structure 120 is set in the horizontal and vertical directions so that the first direction (X-X) and the second direction (Y-Y) are orthogonal to each other at the center point of the first unit structure 120. Both ends of the second linear pattern 124 may be connected to both ends of the first linear pattern 122, respectively. Accordingly, the first linear patterns 122 and the second linear patterns 124 may be formed in a rectangular pattern along the edges of the first unit structure 120.

The electric dipoles 126 are disposed inside the first linear patterns 122 and the second linear patterns 124 to be spaced apart from each other. By adjusting the degree of the separation, the frequency at which the transmittance of microwaves is maximized may be modulated. Hereinafter, in the present embodiment, the electric dipoles 126 extend from the second linear patterns 124 toward the center point of the first unit structure 120 and are disposed to be spaced apart from each other at the center point of the first unit structure 120.

As shown in FIGS. 4 to 6*c*, in the metamaterial structure 100 according to the present embodiment, by selectively changing the structural variables of the first unit structure 120, a resonant frequency band may be changed in a desired direction.

The structural variables of the first unit structure 120 may include at least one of the sizes (d) of the second linear patterns 124, the metal thicknesses (h) of the first and second linear patterns 122 and 124 and the electric dipoles 126, the metal widths (w) of the first and second linear patterns 122 and 124 and the electric dipoles 126, the separation distance (g) of the electric dipoles 126, and the sizes (l) of the electric dipoles 126. Hereinafter, in the present embodiment, the first and second linear patterns 122 and 124 and the electric dipoles 126 are formed to have the same metal thickness (h) and the same metal width (w).

FIGS. 5*a*, 5*b*, 6*a*, 6*b* and 6*c* are graphs showing change in microwave transmittance (T) when the structural variables of the first unit structure 120 are changed.

Figure 5A:
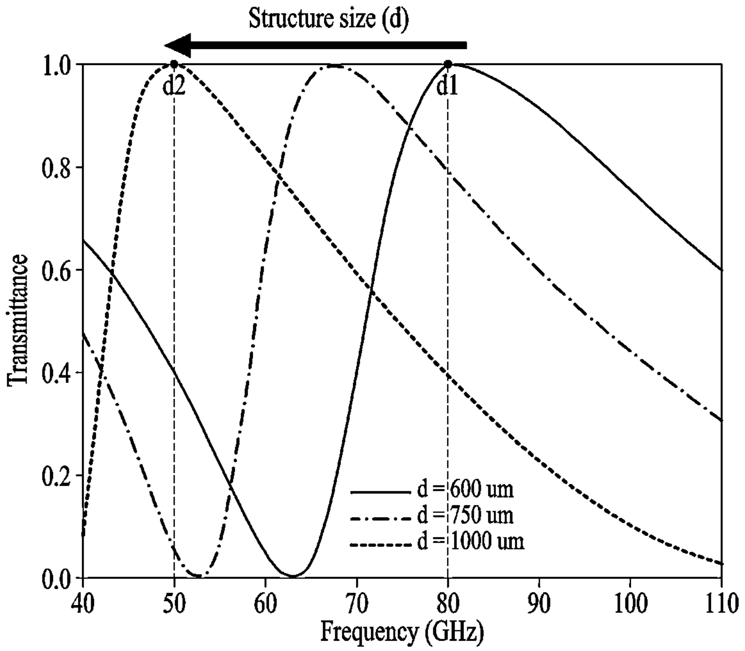
FIGS. 5*a*, 5*b*, 6*a*, 6*b* and 6*c* are graphs showing the results according to change of structural variables for the unit structure of the metamaterial structure shown in FIG. 4.

As shown in FIG. 5*a*, the sizes (d) of the first and second linear patterns 122 and 124 described as "structure size (d)" increase in the direction of the arrow. When the sizes (d) of the first and second linear patterns 122 and 124 increase, as the total area of the first unit structure 120 increases, metal filling fraction (E) may be relatively decreased. At this time, a resonance frequency band is changed from d1 to d2 as the sizes (d) of the first and second linear patterns 122 and 124 are increased.

Figure 5B:
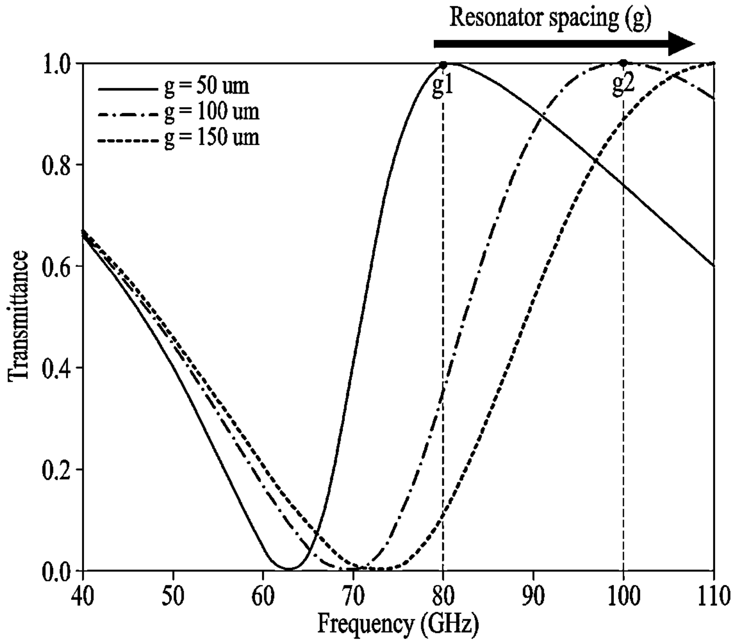

As shown in FIG. 5*b*, the separation distance (g) of the electric dipoles 126 described as "resonator spacing (g)" increases in the direction of the arrow. When the separation distance (g) of the electric dipoles 126 increases, metal filling fraction (E) may decrease. At this time, a resonance frequency band is changed from g1 to g2 as the separation distance (g) of the electric dipoles 126 is increased.

Figure 6A:
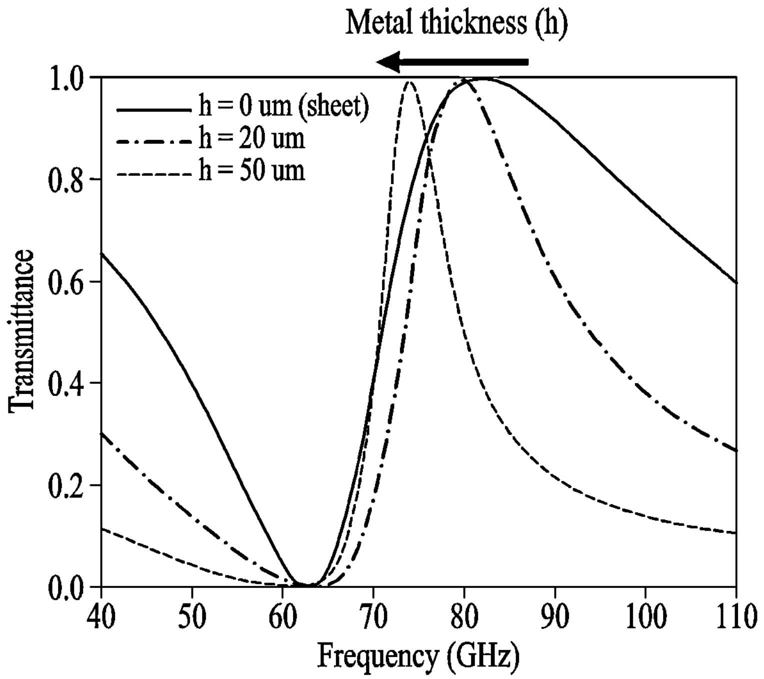

As shown in FIG. 6*a*, the metal thicknesses (h) of the first and second linear patterns 122 and 124 and the electric dipoles 126, which are described as "metal thickness (h)", increase in the direction of the arrow. At this time, a resonant frequency band is decreased as the metal thicknesses (h) of the first and second linear patterns 122 and 124 and the electric dipoles 126 are increased.

Figure 6B:
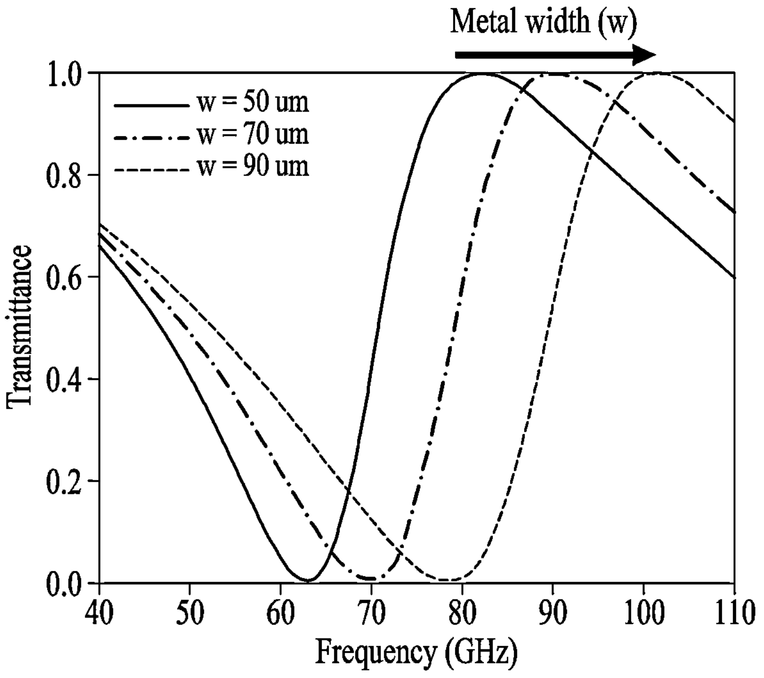

As shown in FIG. 6*b*, the metal widths (w) of the first and second linear patterns 122 and 124 and the electric dipoles 126, which are described as "metal width (w)", increase in the direction of the arrow. When the metal widths (w) of the first and second linear patterns 122 and 124 and the electric dipoles 126 increase, metal filling fraction (E) may be increased. At this time, a resonant frequency band is increased as the metal widths (w) of the first and second linear patterns 122 and 124 and the electric dipoles 126 are increased.

Figure 6C:
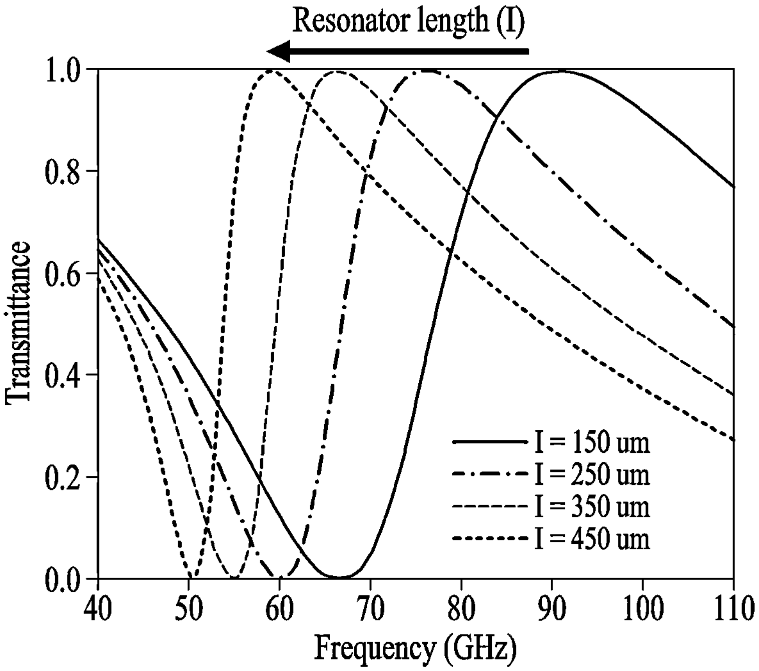

As shown in FIG. 6*c*, the sizes (l) of the electric dipoles 126 described as "resonator length (l)" increase in the direction of the arrow. When the sizes (l) of the electric dipoles 126 increase, metal filling fraction (E) may be increased. At this time, a resonant frequency band is decreased as the sizes (l) of the electric dipoles 126 are increased.

As described above, in the metamaterial structure 100 according to the present embodiment, a resonant frequency band is gradually shifted as the structural variables of the first unit structure 120 are selectively increased or decreased. For example, the metal widths (w) of the first and second linear patterns 122 and 124 and the electric dipoles 126 and the separation distance (g) of the electric dipoles 126 are proportional to a resonant frequency band, but the sizes (d) of the first and second linear patterns 122 and 124, the metal thicknesses (h) of the first and second linear patterns 122 and 124 and the electric dipoles 126, and the sizes (l) of the electric dipoles 126 are inversely proportional to a resonant frequency band. Accordingly, when the metal widths (w) and metal thicknesses (h) of the first and second linear patterns 122 and 124 and the electric dipoles 126, the sizes (l) and separation distance (g) of the electric dipoles 126, and the sizes (d) of the first and second linear patterns 122 and 124 are chosen appropriately, a microwave transmittance (T) close to 100% may be obtained even when metal filling fraction (E) is high. In particular, since the separation distance (g) of the electric dipoles 126 significantly induces transition of a resonant frequency band without affecting metal filling fraction (E), the separation distance (g) may be useful when changing a resonant frequency band to a desired frequency band.

Figure 7:
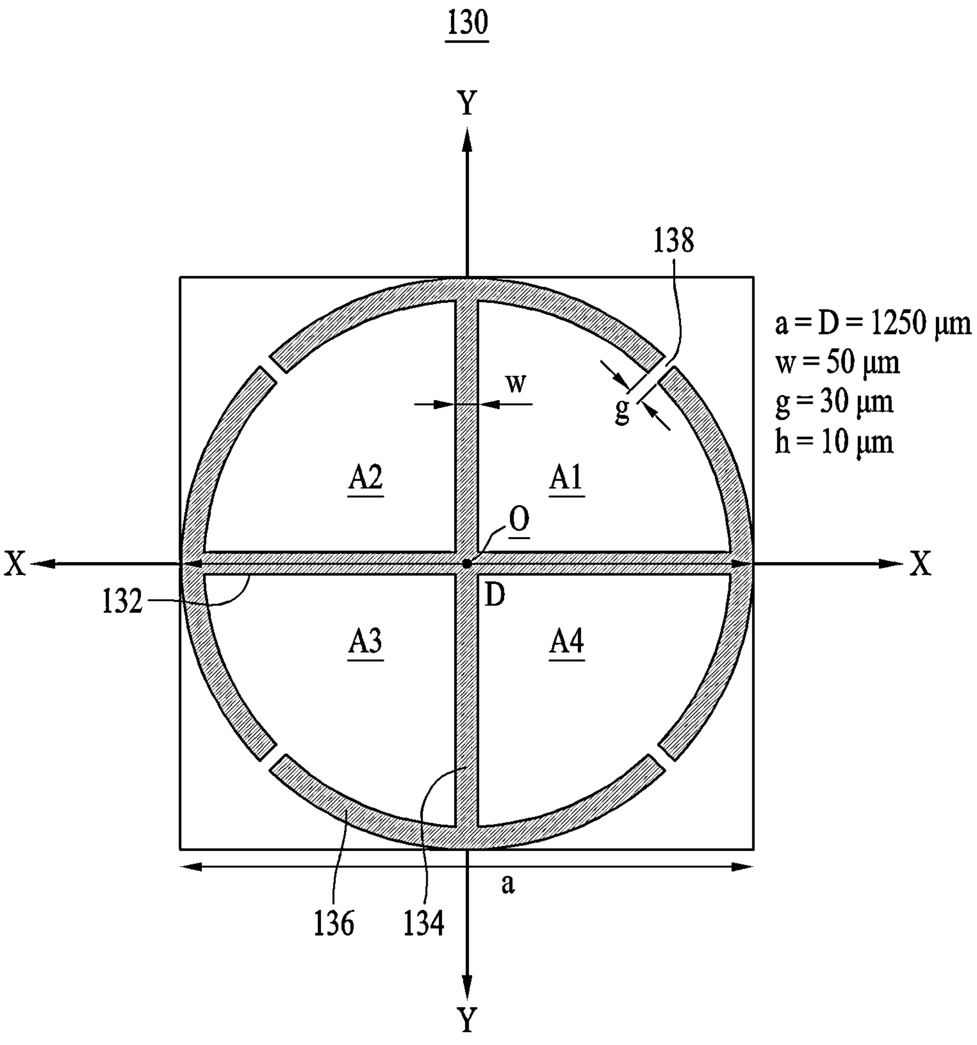
FIG. 7 schematically illustrates a unit structure of a metamaterial structure according to another embodiment of the present disclosure.
Figure 8:
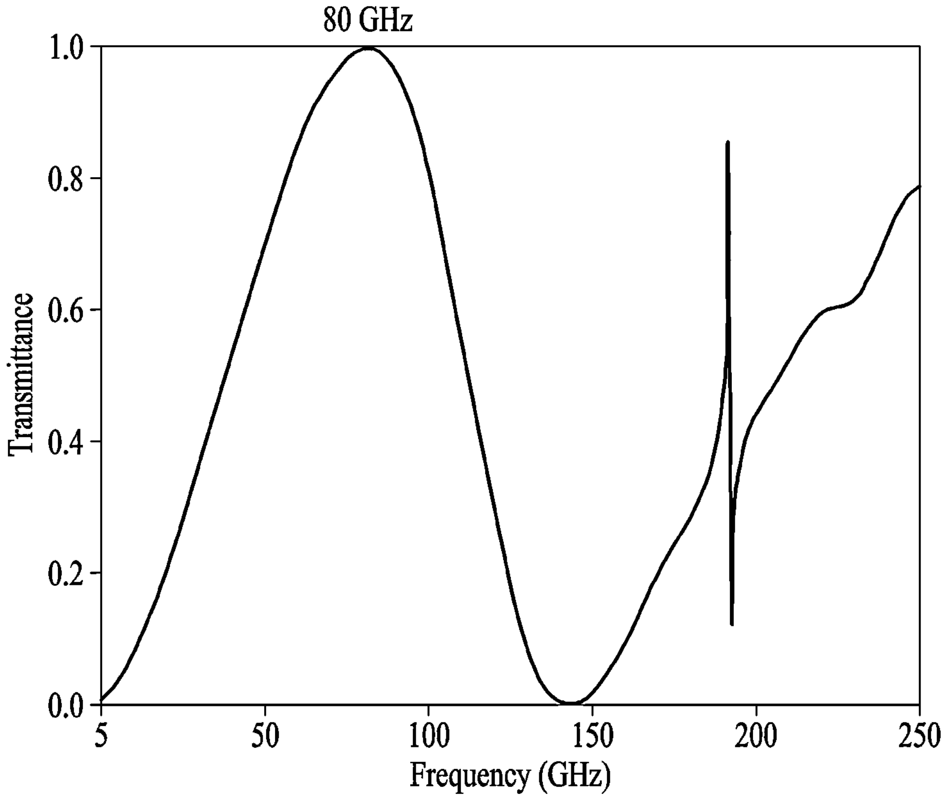
FIG. 8 is a graph showing transmittance change according to the frequency bands of microwaves in the unit structure of the metamaterial structure shown in FIG. 7.

FIG. 7 schematically illustrates a unit structure 130 of a metamaterial structure 100 according to another embodiment of the present disclosure. FIG. 8 is a graph showing change in transmittance (T) according to the frequency bands of microwaves in the unit structure 130 of the metamaterial structure 100 shown in FIG. 7, and FIG. 9 illustrates the metamaterial structure 100 including the unit structures 130 shown in FIG. 7.

Figure 9:
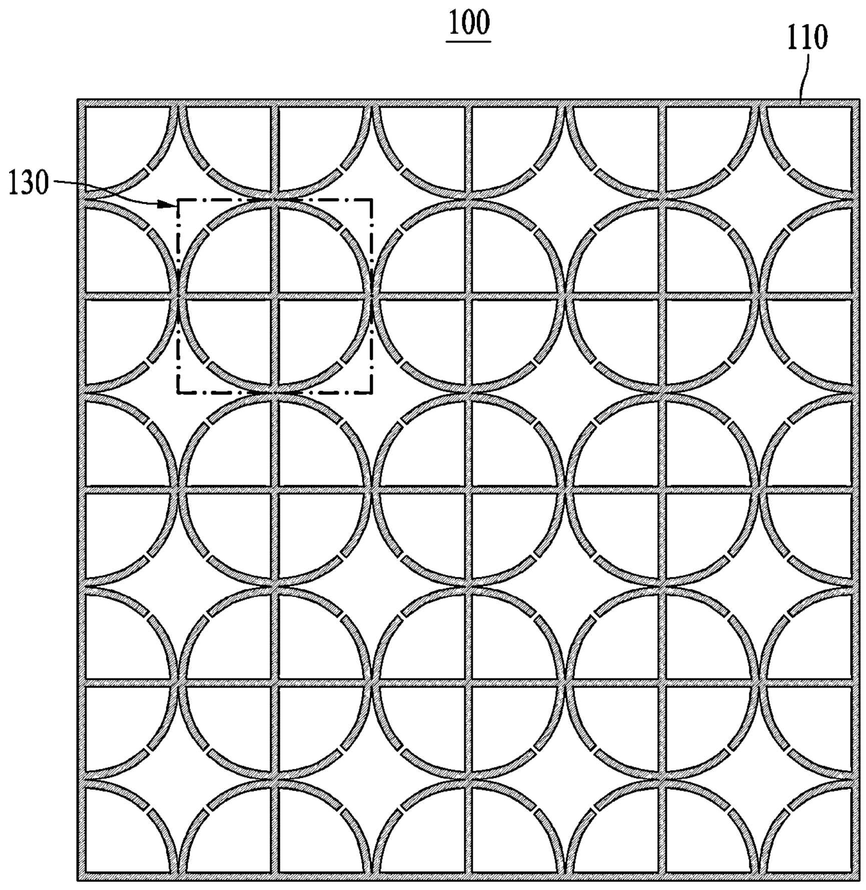
FIG. 9 illustrates a metamaterial structure consisting of a plurality of unit structures shown in FIG. 7.

In FIGS. 7 to 9, the same reference numerals as those shown in FIGS. 1 to 6*c* denote the same members, and detailed description thereof will be omitted. Hereinafter, different points from the first unit structure 120 shown in FIGS. 1 to 6*c* will be mainly described.

Referring to FIGS. 7 to 9, when comparing the second unit structure 130 of the metamaterial structure 100 according to another embodiment of the present disclosure with the first unit structure 120 shown in FIG. 4, the second unit structure 130 is different in that the second unit structure 130 has a structure in which polarization dependence on microwaves is removed and that the second unit structure 130 is electrically interconnected with other adjacent second unit structures 130.

One second unit structure 130 may be disposed per unit area of the metal pattern 110 of the metamaterial structure 100. The metamaterial structure 100 may be formed in a structure in which a plurality of second unit structures 130 is connected in the first direction (X-X) and the second direction (Y-Y). At this time, the metal pattern 110 formed on the metamaterial structure 100 may be provided in a structure in which the unit metal patterns of the second unit structures 130 are electrically interconnected with each other when the second unit structures 130 are continuously connected. Accordingly, since the second unit structures 130 are electrically connected to other second unit structures 130 disposed adjacent to each other, the metal pattern 110 of the metamaterial structure 100 is also electrically connected.

Since the first unit structure 120 shown in FIG. 4 is formed in an asymmetric structure by the electric dipoles 126, the first unit structure 120 normally exhibits complete transmission characteristics in the first direction (X-X) polarization of microwaves, but the first unit structure 120 is not affected by the electric dipoles 126 in the second direction (Y-Y) polarization of microwaves, and thus may not exhibit complete transmission characteristics. Accordingly, since the first unit structure 120 shown in FIG. 4 has polarization dependence on microwaves, there is a disadvantage in that microwave transmission efficiency is reduced. In contrast, since the second unit structure 130 shown in FIG. 7 is formed in a pattern structure symmetrical in both the first direction (X-X) and the second direction (Y-Y), polarization dependence of microwaves may be eliminated, which improves microwave transmission efficiency.

Here, the second unit structure 130 may be provided to have structural symmetry with respect to two directions orthogonal to each other with respect to the center point of the unit area of the metal pattern 110. The second unit structure 130 may be formed in a symmetrical pattern to have polarization independence on microwaves.

In addition, the second unit structure 130 may be formed in an electrically interconnected pattern to perform a heating function when electricity is applied. In the present embodiment, the metal patterns of the second unit structure 130 are formed to have the same thickness and width.

For example, the unit metal pattern of the unit structure 130 according to the present embodiment may include a first linear pattern 132, a second linear pattern 134, and a circular pattern 136.

The first linear pattern 132 may be formed to extend in the first direction (X-X) on the unit area of the metal pattern 110. Hereinafter, in the present embodiment, the first linear pattern 132 may be formed in a linear pattern along the horizontal direction to pass through the center point (O) of the unit area of the metal pattern 110.

The second linear pattern 134 may be formed to extend in the second direction (Y-Y) on the unit area of the metal pattern 110 to intersect the first linear pattern 132. Hereinafter, in the present embodiment, the second linear pattern 134 may be formed in a linear pattern along the vertical direction to pass through the center point (O) of the unit area of the metal pattern 110. Accordingly, the first and second linear patterns 132 and 134 may form a cross pattern within the unit area of the metal pattern 110.

The circular pattern 136 may be provided in a circular shape around the intersection point (O) of the first and second linear patterns 132 and 134. The circular pattern 136 may be formed to be electrically interconnected to the first and second linear patterns 132 and 134. Hereinafter, in the present embodiment, the outer diameter of the circular pattern 136 is formed to be the same as the lengths of the first and second linear patterns 132 and 134.

Here, pattern gaps 138 for performing a function of the electric dipoles 126 of the first unit structure 120 may be provided in the circular pattern 136. The pattern gaps 138 may be formed in a structure in which a portion of the circular pattern 136 is short-circuited. As shown in FIG. 7, when the unit area of the metal pattern 110 is divided into four quadrant areas (A1, A2, A3, and A4), at least one pattern gap 138 may be disposed in each of the four quadrant areas (A1, A2, A3, and A4). Hereinafter, in the present embodiment, a single pattern gap 138 is disposed in each of the four quadrant areas (A1, A2, A3, and A4).

In addition, the first and second linear patterns 132 and 134 and the circular pattern 136 may be respectively formed to be symmetrical with respect to the center point (O) of the unit area of the metal pattern 110. Accordingly, the first and second linear patterns 132 and 134 and the circular pattern 136 may prevent polarization dependence on microwaves through a symmetrical structure.

In addition, also in the second unit structure 130 of the present embodiment, by selectively changing the structural variables of the first and second linear patterns 132 and 134 and the circular pattern 136, the resonant frequency band of microwaves may be easily changed.

For example, the structural variables may include at least one of the length (a1) of the first linear pattern 132, the thickness (h1) of the first linear pattern 132, the width (w1) of the first linear pattern 132, the length (a2) of the second linear pattern 134, the thickness (h2) of the second linear pattern 134, the width (w2) of the second linear pattern 134, the outer diameter (D) of the circular pattern 136, the thickness (h3) of the circular pattern 136, the width (w3) of the circular pattern 136, the separation distance (g) of the pattern gaps 138, and the number of the pattern gaps 138.

Hereinafter, in the present embodiment, in the first and second linear patterns 132 and 134 and the circular pattern 136, lengths (a=a1=a2=a3), widths (w=w1=w2=w3), and thicknesses (h=h1=h2=h3) are all the same. The outer diameter (D) of the circular pattern 136 and the lengths (a=D) of the first and second linear patterns 132 and 134 are the same.

Accordingly, also in the second unit structure 130 of the present embodiment, like the first unit structure 120 of the metamaterial structure 100 according to one embodiment of the present disclosure, a resonant frequency band may be set to a desired band by appropriately changing the structural variables of the second unit structure 130, and the structural variables may be appropriately adjusted to set the desired resonant frequency band.

FIG. 8 is a graph showing microwave transmittance (T) in the second unit structure 130 shown in FIG. 7. Referring to the graph of FIG. 8, the resonant frequency of the second unit structure 130 shown in FIG. 7 is represented by an 80 GHz band.

FIG. 9 illustrates the metamaterial structure 100 in which the second unit structures 130 shown in FIG. 7 are electrically connected to each other in the first direction (X-X) and the second direction (Y-Y). At this time, since the metal pattern 110 of the metamaterial structure 100 has an integrated structure in which all the unit metal patterns of the second unit structures 130 are connected, when electricity is applied to the metal pattern 110, heat is generated in the entire metal pattern 110 to perform a heating function. In addition, since the metal pattern 110 of the metamaterial structure 100 has a structure in which the unit metal patterns of the second unit structures 130 are symmetrically connected in the first direction (X-X) and the second direction (Y-Y), the metamaterial structure 100 does not have the polarization dependent transmission with respect to microwaves, thereby increasing microwave transmission efficiency. The metamaterial structure 100 may be used in a metamaterial-type transparent heater 200 to be described later.

Figure 10A:
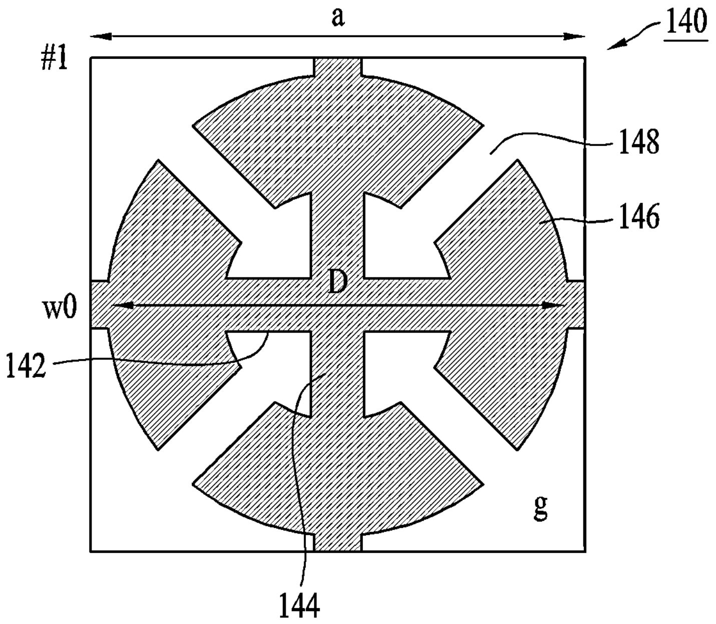
FIGS. 10*a* to 10*c* schematically illustrates unit structures of a metamaterial structure according to still another embodiment of the present disclosure.
Figure 10B:
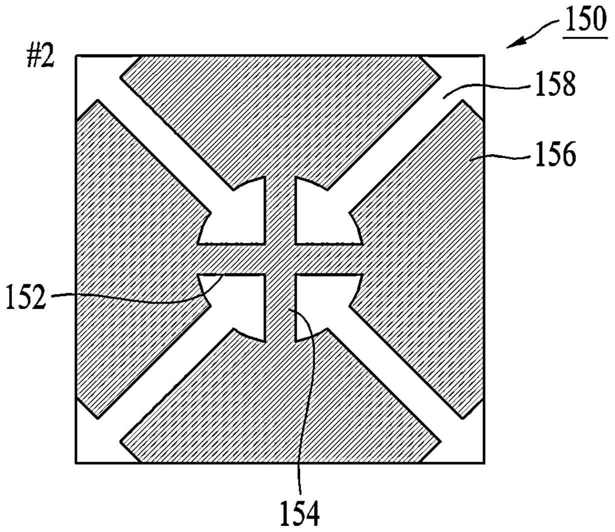
Figures 10C, 11:
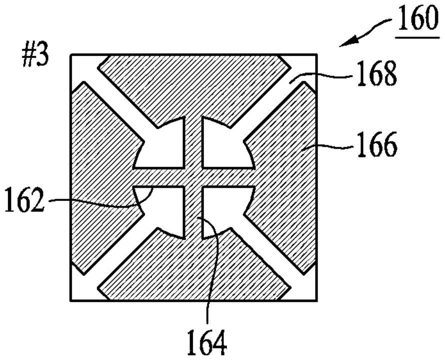
FIG. 11 is a table showing numerical values of structural variables and metal filling fractions of the unit structures shown in FIGS. 10*a* to 10*c;*

FIGS. 10*a* to 10*c* schematically illustrates unit structures 140, 150, and 160 of the metamaterial structure 100 according to still another embodiment of the present disclosure, FIG. 11 is a table showing numerical values of the structural variables and metal filling fraction (E) of the unit structures 140, 150, and 160 shown in FIGS. 10*a* to 10*c*, and FIG. 12 is a graph showing transmittance change according to the frequency bands of microwaves in the unit structures 140, 150, and 160 shown in FIGS. 10*a* to 10*c*. FIG. 13 illustrates the metamaterial structure 100 including the third unit structure 140 among the unit structures 140, 150, and 160 shown in FIGS. 10*a* to 10*c*, and FIG. 14 illustrates the metamaterial structure 100 including the fourth unit structure 150 or the fifth unit structure 160 among the unit structures 140, 150, and 160 shown in FIGS. 10*a* to 10*c*.

In FIGS. 10*a* to 14, the same reference numerals as those shown in FIGS. 7 to 9 denote the same members, and detailed description thereof will be omitted. Hereinafter, different points from the second unit structure 130 shown in FIGS. 7 to 9 will be mainly described.

FIGS. 10*a* to 10*c* illustrates the third, fourth, and fifth unit structures 140, 150, and 160 corresponding to another modified example of the second unit structure 130 shown in FIG. 7. The third unit structure 140, the fourth unit structure 150, and the fifth unit structure 160 are modified examples in which structural variables are variously changed based on the unit metal pattern of the second unit structure 130 shown in FIG. 7. Accordingly, in the present embodiment, without being limited to the unit structures 140, 150, and 160 shown in FIG. 7, various modified examples may be additionally designed by appropriately changing structural variables according to design conditions and circumstances of the metamaterial structure 100.

For reference, in the present embodiment, the third, fourth, and fifth unit structures 140, 150, and 160 are obtained by modifying the second unit structure 130 while maintaining structural symmetry in the unit metal pattern of the second unit structure 130, and do not have polarization dependence on microwaves. By providing the metal pattern 110 of the metamaterial structure 100 in an electrically interconnected integrated structure, a heating function may be performed when electricity is applied.

Hereinafter, the third, fourth, and fifth unit structures 140, 150, and 160 according to the present embodiment will be described in more detail with reference to FIGS. 10*a* to 14.

Referring to FIG. 10*a*, the unit metal pattern of the third unit structure 140 may include a first linear pattern 142, a second linear pattern 144, and a circular pattern 146.

Here, the first and second linear patterns 142 and 144 may be formed in a form corresponding to the first and second linear patterns 132 and 134 of the second unit structure 130 shown in FIG. 7, and thus detailed description thereof will be omitted.

In addition, similarly to the circular pattern 136 shown in FIG. 7, the circular pattern 146 may be provided in a circular shape around the intersection point of the first and second linear patterns 142 and 144. The circular pattern 146 may be formed to be electrically interconnected with the first and second linear patterns 142 and 144. In this case, pattern gaps 148 are provided in the circular pattern 146 and may be formed to have the same shape and arrangement structure as the pattern gaps 138 illustrated in FIG. 7.

Unlike the circular pattern 136 shown in FIG. 7, the outer diameter (D) of the circular pattern 146 may be less than the lengths (a) of the first and second linear patterns 142 and 144, and the width (w1) of the circular pattern 146 may be greater than the widths (w0) of the first and second linear patterns 142 and 144.

As shown in FIGS. 10*a* and 11, also in the third unit structure 140 according to the present embodiment, the resonant frequency band of microwaves may be easily changed by selectively changing the structural variables of the first and second linear patterns 142 and 144 and the circular pattern 146. For example, the structural variables of the third unit structure 140 may include at least one of the lengths (a) of the first and second linear patterns 142 and 144, the widths (w0) of the first and second linear patterns 142 and 144, the outer diameter (D) of the circular pattern 146, the width (w1) of the circular pattern 146, the separation distance (g) of the pattern gaps 148, and the number of the pattern gaps 148.

The structural variables of the third unit structure 140 are set so that the lengths (a) of the first and second linear patterns 142 and 144 are the same, the widths (w0) of the first and second linear patterns 142 and 144 are the same, the outer diameter (D) of the circular pattern 146 is less than the lengths (a) of the first and second linear patterns 142 and 144, and the separation distance (g) of the pattern gaps 148 is identical to the widths (w0) of the first and second linear patterns 142 and 144.

Referring to FIG. 10*b*, the unit metal pattern of the fourth unit structure 150 may include a first linear pattern 152, a second linear pattern 154, and a circular pattern 156.

Here, the first and second linear patterns 152 and 154 may be formed in a form corresponding to the first and second linear patterns 132 and 134 of the second unit structure 130 shown in FIG. 7, and thus detailed description thereof will be omitted.

In addition, the circular pattern 156 may be provided in a circular shape around the intersection point of the first and second linear patterns 152 and 154, similarly to the circular pattern 136 shown in FIG. 7. The circular pattern 156 may be formed to be electrically interconnected with the first and second linear patterns 152 and 154. At this time, pattern gaps 158 may be provided in the circular pattern 156 and may be formed to have the same shape and arrangement structure as the pattern gaps 138 shown in FIG. 7.

Unlike the circular pattern 136 shown in FIG. 7, the outer diameter (D) of the circular pattern 156 may be greater than the lengths (a) of the first and second linear patterns 152 and 154, and the width (w1) of the circular pattern 156 may also be much greater than the widths (w0) of the first and second linear patterns 152 and 154.

As shown in FIGS. 10*b* and 11, also in the fourth unit structure 150 according to the present embodiment, by selectively changing the structural variables of the first and second linear patterns 152 and 154 and the circular pattern 156, the resonant frequency band of microwaves may be easily changed. For example, the structural variables of the fourth unit structure 150 may include at least one of the lengths (a) of the first and second linear patterns 152 and 154, the widths (w0) of the first and second linear patterns 152 and 154, the outer diameter (D) of the circular pattern 156, the width (w1) of the circular pattern 156, the separation distances (g) of the pattern gaps 158, and the number of the pattern gaps 158.

The structural variables of the fourth unit structure 150 are set so that the lengths (a) of the first and second linear patterns 152 and 154 are the same, the widths (w0) of the first and second linear patterns 152 and 154 are the same, the outer diameter (D) of the circular pattern 156 is greater than the lengths (a) of the first and second linear patterns 152 and 154, and the separation distances (g) of the pattern gaps 158 are identical to the widths (w0) of the first and second linear patterns 152 and 154.

Referring to FIG. 10*c*, the unit metal pattern of the fifth unit structure 160 may include a first linear pattern 162, a second linear pattern 164, and a circular pattern 166.

The fifth unit structure 160 corresponds to a model obtained by reducing the fourth unit structure 150 shown in FIG. 10*b* to a relatively small size. That is, the first and second linear patterns 162 and 164 and the circular pattern 166 of the fifth unit structure 160 are formed like the first and second linear patterns 152 and 154 and the circular pattern 156 shown in FIG. 10*b*. Accordingly, detailed description of the first and second linear patterns 162 and 164 and the circular pattern 166 of the fifth unit structure 160 will be omitted.

However, in the fifth unit structure 160 of the present embodiment, the first and second linear patterns 162 and 164 and the circular pattern 166 may be provided to be small according to different reduction ratios with respect to the first and second linear patterns 152 and 154 and the circular pattern 156 shown in FIG. 10*b*. That is, the fifth unit structure 160 may have the same pattern structure as that of the fourth unit structure 150 and may be reduced to be smaller than the fourth unit structure 150, and the reduction ratios of the structure variables may be set differently.

As shown in FIGS. 10*c* and 11, the widths (w0) of the first and second linear patterns 162 and 164 are reduced at a ratio of 0.75 (75/100) to the widths (w0) of the first and second linear patterns 152 and 154 shown in FIG. 10*b*, but the outer diameter (D) the circular pattern 166 is reduced at a ratio of 0.8 (1200/1500) to the outer diameter (D) of the circular pattern 156 shown in FIG. 10*b*.

FIG. 11 is a table in which the numerical values of structural variables and metal filling fraction (E) for the third, fourth, and fifth unit structures 140, 150, and 160 are summarized. However, the above values are only an example and may be variously changed according to design conditions and circumstances of the metamaterial structure 100. In the case of metal filling fraction (E), the third unit structure 140 exhibits 51.31%, the fourth unit structure 150 exhibits 74.82%, and the fifth unit structure 160 exhibits 71.15%. Accordingly, it can be seen that the third unit structure 140 uses the smallest amount metallic material per unit area for forming a unit metal pattern. For reference, the third unit structure 140 is marked with "#1 (μm)", the fourth unit structure 150 is marked with "#2 (μm)", the fifth unit structure 160 is marked with "#3 (μm)", and metal filling fraction (E) is marked with "metal %".

Figure 12:
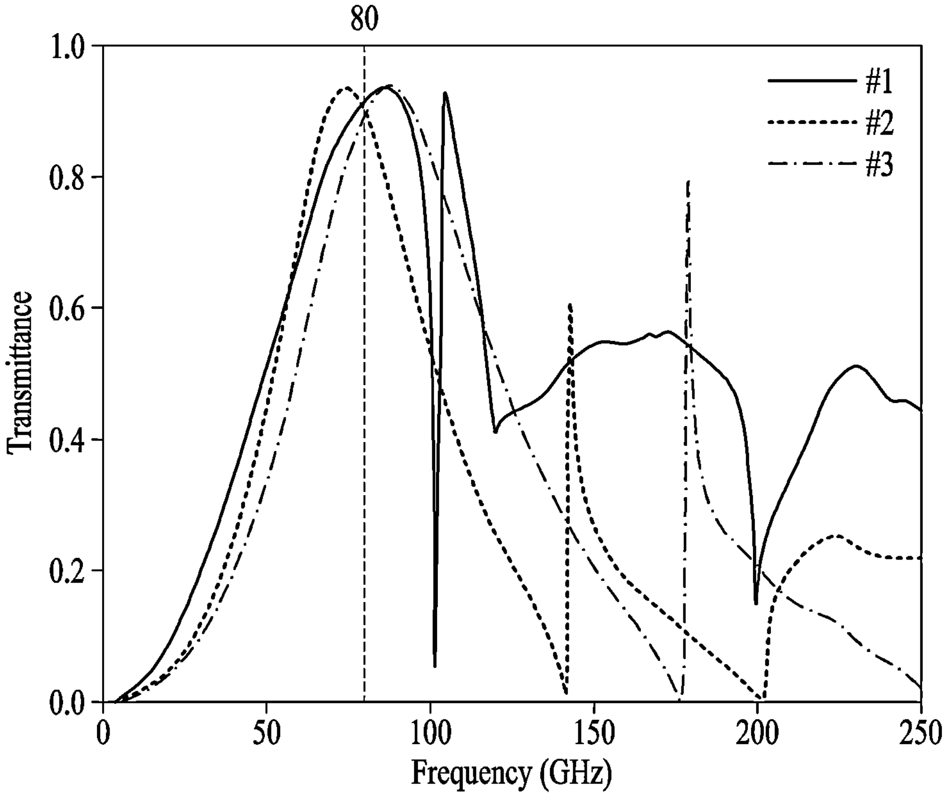
FIG. 12 is a graph showing transmittance change according to the frequency bands of microwaves in the unit structures shown in FIGS. 10*a* to 10*c;*
Figure 13:
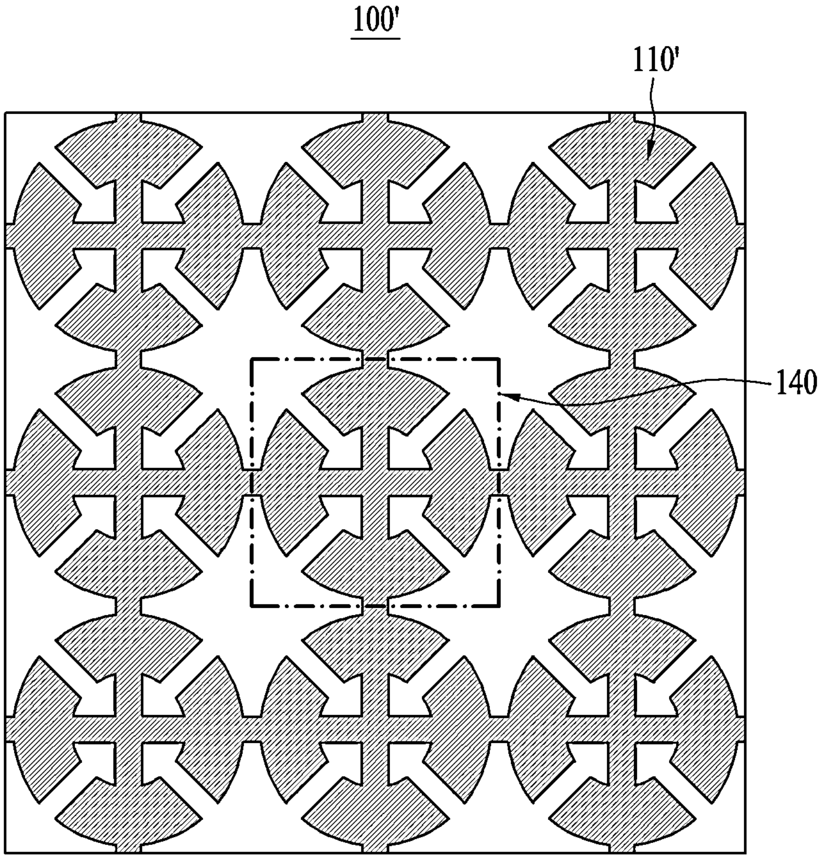
FIG. 13 illustrates a metamaterial structure formed of FIG. 10*a* among the unit structures shown in FIGS. 10*a* to 10*c;*

FIG. 12 is a graph showing change in microwave transmittance (T) according to the frequency bands of microwaves in the third, fourth, and fifth unit structures 140, 150, and 160. Based on the results, it can be confirmed that the resonant frequency bands of microwaves of the third, fourth, and fifth unit structures 140, 150, and 160 according to the present embodiment are formed in the 80 GHz region.

Figure 14:
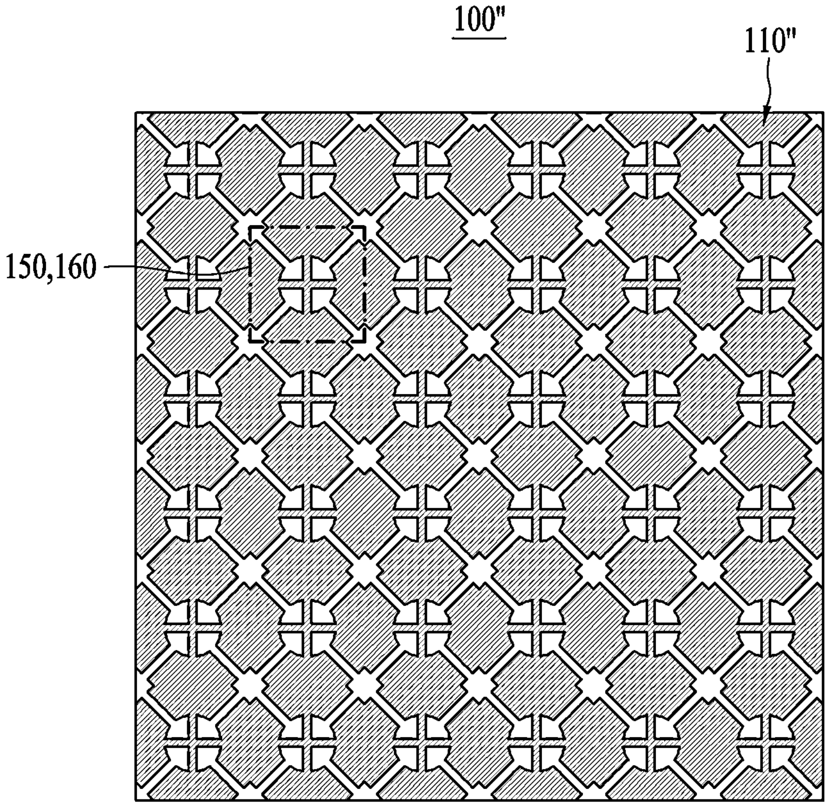
FIG. 14 illustrates a metamaterial structure formed of FIG. 10*b* or FIG. 10*c* among the unit structures shown in FIGS. 10*a* to 10*c;*

FIGS. 13 and 14 illustrate metamaterial structures 100' and 100" composed of any one of the third, fourth, and fifth unit structures 140, 150, and 160 shown in FIGS. 10*a* to 10*c*. A metal pattern 110' of the metamaterial structure 100' shown in FIG. 13 may be provided in an integrated structure in which the unit metal patterns of the third unit structures 140 are electrically connected to each other in the first direction (X-X) and the second direction (Y-Y). The metal pattern 110" of the metamaterial structure 100" shown in FIG. 14 may be provided in an integrated structure in which any one unit metal pattern of the fourth unit structures 150 or the fifth unit structures 160 are electrically connected to each other in the first direction (X-X) and the second direction (Y-Y). Since the metal patterns 110' and 100" of the metamaterial structures 100' and 100" shown in FIGS. 13 and 14 have structural symmetry, the metal patterns 110' and 100" do not have polarization transmission for microwaves. In addition, by forming a structure in which the metal patterns 110 are connected to each other, the structure may perform a heating function when electricity is applied.

Figure 15:
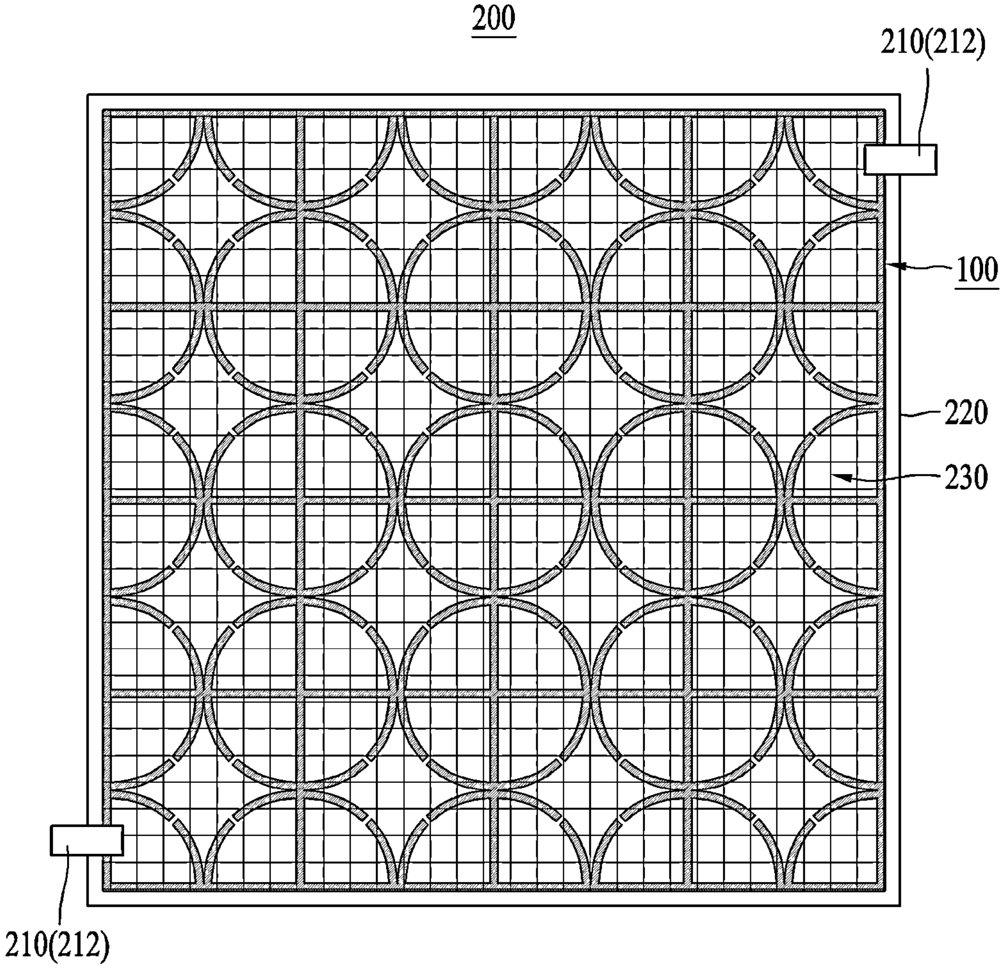
FIG. 15 schematically illustrates a metamaterial-type transparent heater to which the metamaterial structure shown in FIG. 9 is applied.
Figure 16:
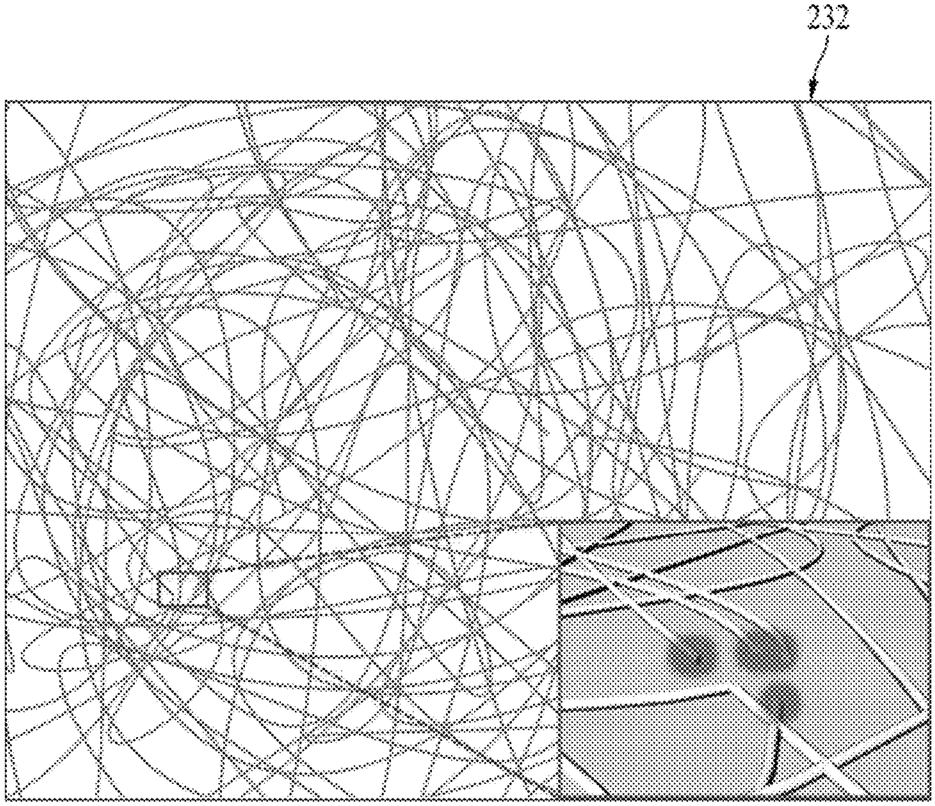
FIG. 16 shows another modified example of the nanoconductor shown in FIG. 15.

FIG. 15 schematically illustrates the metamaterial-type transparent heater 200 to which the metamaterial structure 100 shown in FIG. 9 is applied, and FIG. 16 illustrates another modified example of a nano-conductor 230 shown in FIG. 15.

Referring to FIG. 15, the metamaterial-type transparent heater 200 according to the present embodiment may include the metamaterial structure 100 and an electrical terminal 210.

Here, since the metamaterial structure 100 has the same structure as the metamaterial structure 100 shown in FIG. 9, detailed description thereof will be omitted.

In addition, one end of the electrical terminal 210 may be connected to one side of the metamaterial structure 100, and external electricity for heating the metamaterial structure 100 may be applied to the other end of the electrical terminal 210. However, the present disclosure is not limited thereto, and the electrical terminal 210 may be formed in a structure in which the metal pattern 110 of the metamaterial structure 100 is extended.

In addition, the metamaterial-type transparent heater 200 according to the present embodiment may further include a transparent film 220 and the nano-conductor 230.

The transparent film 220 is a film member for safely supporting the metamaterial structure 100 and the electrical terminal 210, and one end of the metamaterial structure 100 and the electrical terminal 210 may be coated with the transparent film 220. One end of the metamaterial structure 100 and the electrical terminal 210 is preferably disposed between a pair of the transparent films 220 in an integrated structure.

The nano-conductor 230 may be disposed to be in electrical contact with at least one of the upper and lower surfaces of the metamaterial structure 100. The nano-conductor 230 may improve the electrical interconnectivity of the metal pattern 110 of the metamaterial structure 100. Accordingly, the nano-conductor 230 may be disposed at a portion where the metal pattern 110 is not present in the metamaterial structure 100 to generate heat in combination with the metal pattern 110 of the metamaterial structure 100. As a result, the sheet resistance, heating temperature, and temperature uniformity of the metamaterial-type transparent heater 200 may be improved.

The nano-conductor 230 may include at least one of metal nanowires, metal fibers, and carbon nanotubes. Hereinafter, in the present embodiment, a plurality of nano-conductors 230 may be formed in a woven structure, a non-woven structure, or a short fiber structure.

For example, FIG. 16 illustrates a modified example of a nano-conductor 232 manufactured by electrospinning. The nano-conductor 232 shown in FIG. 16 may be manufactured by electrospinning metal fibers or carbon nanotubes on the upper surface of the metamaterial structure 100 in the manufacturing process of the metamaterial structure 100.

Accordingly, the nano-conductor 232 shown in FIG. 16 may be formed in a randomly dispersed structure.

Figure 17:
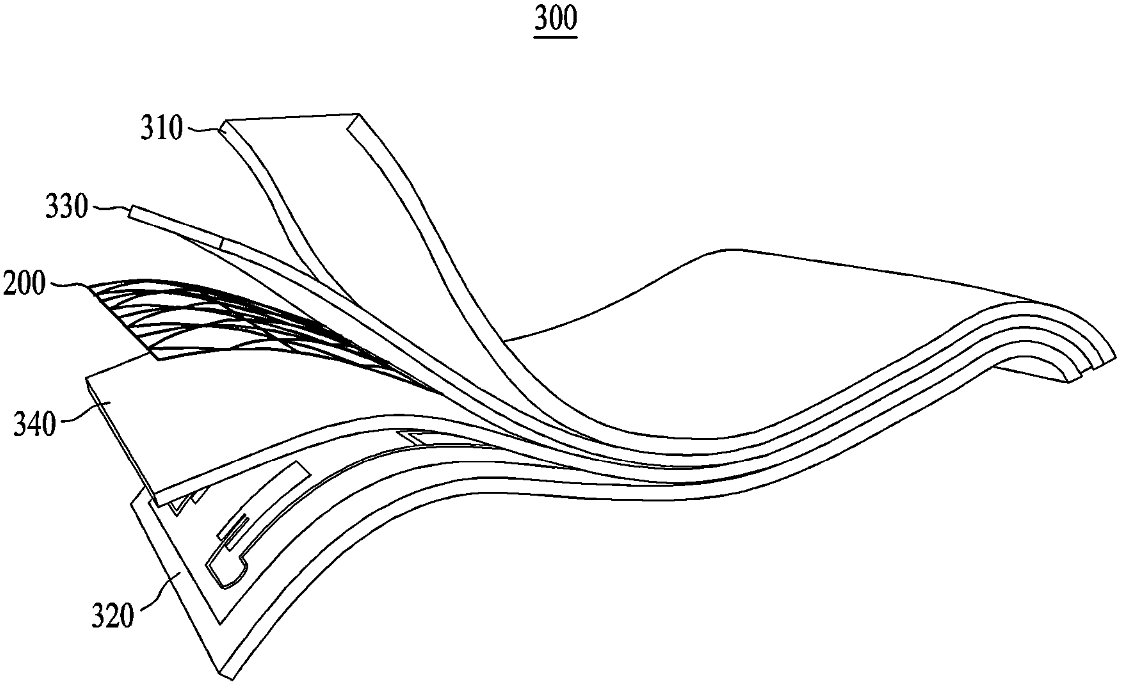
FIG. 17 schematically illustrates a radar apparatus including the metamaterial-type transparent heater shown in FIG. 15.

FIG. 17 schematically illustrates the radar apparatus 300 including the metamaterial-type transparent heater 200 shown in FIG. 15.

Referring to FIG. 11, the radar apparatus 300 according to the present embodiment may include the metamaterial-type transparent heater 200, a protective cover 310, a radar sensor module 320, an insulation packaging member 330 and a substrate member 340.

Here, since the metamaterial-type transparent heater 200 has the same structure as the metamaterial-type transparent heater 200 shown in FIG. 10*a*, detailed description thereof will be omitted.

In addition, the protective cover 310 is a transparent protective material for protecting the metamaterial-type transparent heater 200 and may be disposed on the front surface of the metamaterial-type transparent heater 200. Haze due to frost, icing, etc. may be generated from the protective cover 310 under harsh environmental conditions. However, the haze of the protective cover 310 may be reliably removed by heat generated by the metamaterial-type transparent heater 200.

In addition, the radar sensor module 320 may detect an obstacle or a person in front of the protective cover 310 based on microwaves passing through the protective cover 310 and the metamaterial-type transparent heater 200. The radar sensor module 320 may be disposed on the rear surface of the metamaterial-type transparent heater 200.

In addition, the insulation packaging member 330 may be disposed between the metamaterial-type transparent heater 200 and the protective cover 310. The insulation packaging member 330 may be formed of a transparent insulating film and may be attached to the metamaterial-type transparent heater 200 and the protective cover 310 in close contact.

In addition, the substrate member 340 may be disposed between the metamaterial-type transparent heater 200 and the radar sensor module 320. The substrate member 340 is formed of a transparent composite film and is preferably formed of an insulating material so that the radar sensor module 320 is not affected by heat generated by the metamaterial-type transparent heater 200.

Since the transparent heater 200, the protective cover 310, the radar sensor module 320, the insulation packaging member 330, and the substrate member 340 are formed of flexible and stretchable materials, these components may be arranged in a curved shape according to the installation space and design conditions of the radar apparatus 300. For reference, in the radar apparatus 300 according to the present embodiment, the resonant frequency band of microwaves may vary according to the permittivity values of the insulation packaging member 330 and the substrate member 340. Accordingly, when designing the radar apparatus 300, it is necessary to consider the change of the resonant frequency band due to the permittivity of the insulation packaging member 330 and the substrate member 340.

A metamaterial structure according to one embodiment of the present disclosure is formed of a metal pattern capable of approaching microwave transmittance up to the transmittance of air in a specific frequency band of microwaves. Since the metal pattern has an electrically interconnected structure, microwaves pass smoothly to prevent deterioration of communication quality due to microwaves, and heat is generated when electricity is applied, thereby stably performing a function as a heater.

In addition, since the metamaterial structure according to one embodiment of the present disclosure has a structure that maintains microwave transmittance close to 100% regardless of the metal filling fraction of a metal pattern, a transparent heater can be easily manufactured using a metal pattern having high electrical conductivity without impeding microwave propagation.

In addition, since the metamaterial structure according to one embodiment of the present disclosure is provided as a metal pattern in which a plurality of unit structures having structural symmetry are connected, the polarization dependence of microwaves is not expressed. Accordingly, deterioration of microwave transmittance due to polarization dependence may be prevented in advance.

In addition, in the case of the metamaterial structure according to one embodiment of the present disclosure, with a simple design change of changing the structural variables of a metal pattern, a specific frequency band in which a microwave transmittance approaches 100% can be easily set. In addition, a structure of a metal pattern corresponding to a specific frequency band in which a microwave transmittance approaches 100% can be simply designed.

In addition, a metamaterial-type transparent heater according to one embodiment of the present disclosure has a microwave transmittance in a specific frequency band of microwaves similar to that of air and has a structure to which a metamaterial structure formed in electrically interconnected metal patterns is applied. Accordingly, since the metal-patterned metamaterial structure does not interfere with communication of microwaves in a specific frequency band, in a specific frequency band of microwaves, deterioration of microwave communication quality can be prevented in advance, and electricity can be applied to the metal-patterned metamaterial structure to stably perform a heating function. In particular, since the metamaterial-type transparent heater according to the present disclosure has a metamaterial structure formed in metal patterns, the transparent heater has high durability and high elasticity. In addition, the metamaterial type transparent heater can be bent in a curved shape depending on installation conditions and usage environment.

In addition, the metamaterial-type transparent heater according to one embodiment of the present disclosure has a structure in which a plurality of nano-conductors is disposed on the upper or lower part of a metamaterial structure. Accordingly, interconnectivity of the metal patterns of the metamaterial structure can be increased, and accordingly, temperature uniformity according to the location of the metamaterial structure can be improved. Accordingly, in the metamaterial-type transparent heater according to the present disclosure, heat can be uniformly dissipated over the entire area by the metamaterial structure and the nano-conductors.

In addition, a radar apparatus according to one embodiment of the present disclosure has a structure in which a metamaterial-type transparent heater to which a metamaterial structure is applied is disposed between a protective cover and a radar sensor module. Accordingly, since the metamaterial-type transparent heater has a very high microwave transmittance, a process of transmitting and receiving microwaves of a radar sensor module is not hindered by the metamaterial-type transparent heater. In addition, the electric conductivity of the metamaterial-type transparent heater is very good, and thus a heater performance can be stably secured. Accordingly, even when the radar apparatus is used in a harsh environment, the constant temperature maintenance function of the metamaterial-type transparent heater can prevent mist caused by icing or frost occurring on the protective cover, thereby reliably securing the function of the radar apparatus.

Although the present disclosure has been described through limited examples and figures, the present disclosure is not intended to be limited to the examples. Those skilled in the art will appreciate that various modifications, additions, and substitutions are possible, without departing from the scope and spirit of the invention. Therefore, the scope of the present disclosure should not be limited by the embodiments but should be determined by the following claims and equivalents to the following claims.

What is claimed is:

1. A metamaterial structure formed in a metal pattern, wherein the metal pattern is provided in an electrically interconnected form to perform a heating function, wherein the metal pattern is formed so that, for both polarizations orthogonal to each other in a specific frequency band of microwaves, a relationship between a metal filling fraction (E) at which a metal is filled per unit area of the metal pattern and a microwave transmittance (T) satisfies an equation of $T>(1-E)$, wherein the metal pattern is provided in a structure in which a plurality of unit structures are continuously connected, and one unit structure is disposed per unit area of the metal pattern and is electrically interconnected with other adjacent unit structures, wherein at least one electric dipole induced by a partial gap of the metal pattern is provided in the unit structure, wherein the specific frequency band of microwaves is changed by selectively changing structural variables of the unit structure, and wherein the structural variables comprise at least one of a size of the unit structure, a metal thickness of the unit structure, a metal width of the unit structure, a separation distance of the electric dipoles, and a size of the electric dipoles.

2. The metamaterial structure according to claim 1, wherein the specific frequency band of microwaves is set to 70 to 110 GHz comprising a W band, and the microwave transmittance satisfies an equation of T>(1-E) regardless of a size of the metal filling fraction in the specific frequency band of microwaves.

3. The metamaterial structure according to claim 1, wherein the metal pattern is formed of at least one metallic material of copper, silver, gold, aluminum, a liquid metal, and an alloy containing any one of copper, silver, gold, and aluminum.

4. The metamaterial structure according to claim 3, wherein patterning of the metal pattern is performed by any one process of a semiconductor lithography process or a printing process.

5. The metamaterial structure according to claim 1, wherein the unit structure has structural symmetry with respect to two directions orthogonal to each other with respect to a center point of a unit area of the metal pattern to prevent the occurrence of polarization dependent microwave transmittance.

6. A metamaterial-type transparent heater, comprising:

the metamaterial structure according to claim 1; and an electrical terminal having one end connected to one side of the metamaterial structure and the other side to which external electricity for heating the metamaterial structure is applied.

7. The metamaterial-type transparent heater according to claim 6, further comprising a transparent film for stably supporting the metamaterial structure and the electrical terminal, wherein one end of the metamaterial structure and the electrical terminal is coated with the transparent film.

8. The metamaterial-type transparent heater according to claim 6, further comprising a plurality of nano-conductors disposed to be in electrical contact with any one surface of upper and lower surfaces of the metamaterial structure and configured to improve temperature uniformity of the metamaterial structure by improving interconnectivity of a metal pattern of the metamaterial structure, wherein the nano-conductors comprise at least one of metal nanowires, metal fibers, and carbon nanotubes.

9. A radar apparatus, comprising:

the metamaterial-type transparent heater according to claim 6;

a transparent protective cover disposed on a front surface of the metamaterial-type transparent heater to protect the metamaterial-type transparent heater; and a radar sensor module disposed on a rear surface of the metamaterial-type transparent heater to detect an obstacle in front of the protective cover through microwaves passing through the protective cover and the metamaterial-type transparent heater.

10. The radar apparatus according to claim 9, further comprising a transparent insulation packaging member disposed between the metamaterial-type transparent heater and the protective cover; and a transparent substrate member disposed between the metamaterial-type transparent heater and the radar sensor module.

11. A metamaterial structure formed in a metal pattern, wherein the metal pattern is provided in an electrically interconnected form to perform a heating function, wherein the metal pattern is formed so that, for both polarizations orthogonal to each other in a specific frequency band of microwaves, a relationship between a metal filling fraction (E) at which a metal is filled per unit area of the metal pattern and a microwave transmittance (T) satisfies an equation of T>(1-E), wherein the metal pattern is provided in a structure in which a plurality of unit structures are continuously connected, and one unit structure is disposed per unit area of the metal pattern and is electrically interconnected with other adjacent unit structures, wherein the unit structure comprises a first linear pattern formed to extend in a first direction on a unit area of the metal pattern;

a second linear pattern formed to extend in a second direction on a unit area of the metal pattern so as to intersect the first linear pattern; and a circular pattern provided in a circular shape around an intersection point of the first and second linear patterns and electrically interconnected with the first and second linear patterns.

12. The metamaterial structure according to claim 11, wherein pattern gaps for performing an electric dipole function of the unit structure are provided in the circular pattern, wherein the pattern gaps are formed in a structure in which a predetermined portion of the circular pattern is short-circuited.

13. The metamaterial structure according to claim 12, wherein, when the unit area of the metal pattern is divided into four quadrant regions, the at least one pattern gap is respectively disposed in the four quadrant areas.

14. The metamaterial structure according to claim 12, wherein the first and second linear patterns and the circular pattern are each formed to be symmetrical with respect to a center point of the unit area of the metal pattern to prevent the occurrence of polarization dependent microwave transmittance.

15. The metamaterial structure according to claim 12, wherein the specific frequency band of microwaves are changed by selectively changing structural variables of the first and second linear patterns and the circular pattern, wherein the structural variables comprise at least one of a length of the first linear pattern, a thickness of the first linear pattern, a width of the first linear pattern, a length of the second linear pattern, a thickness of the second linear pattern, a width of the second linear pattern, a diameter of the circular pattern, a thickness of the circular pattern, a width of the circular pattern, a separation distance of the pattern gaps, and the number of the pattern gaps.

* * * * *